(12) United States Patent
Magno

(10) Patent No.: US 8,025,180 B2
(45) Date of Patent: Sep. 27, 2011

(54) CAPSULE DISPENSING APPARATUS

(75) Inventor: Alessandro Magno, Brembate Sopra (IT)

(73) Assignee: N & W Global Vending S.p.A., Valbrembo (Bergamo) (IT)

( * ) Notice: Subject to any disclaimer, the term of this patent is extended or adjusted under 35 U.S.C. 154(b) by 848 days.

(21) Appl. No.: 11/885,676

(22) PCT Filed: Feb. 22, 2006

(86) PCT No.: PCT/EP2006/060194
§ 371 (c)(1),
(2), (4) Date: Dec. 7, 2007

(87) PCT Pub. No.: WO2006/097399
PCT Pub. Date: Sep. 21, 2006

(65) Prior Publication Data
US 2008/0277409 A1    Nov. 13, 2008

(30) Foreign Application Priority Data
Mar. 17, 2005   (IT) ............................. PN2005A0018

(51) Int. Cl.
*B65H 3/00* (2006.01)
*G07F 11/00* (2006.01)
*G07F 11/24* (2006.01)

(52) U.S. Cl. .................. 221/196; 221/119; 221/129.1; 221/278; 221/96; 221/113; 221/121; 221/115; 221/116; 221/299; 221/277; 221/281; 221/147; 221/108; 221/109

(58) Field of Classification Search .................. 221/119, 221/129.1, 278, 96, 113, 121, 115, 152, 116, 221/299, 196, 277, 281, 147, 108, 109; 273/138.1
See application file for complete search history.

(56) References Cited

U.S. PATENT DOCUMENTS

| | | | | |
|---|---|---|---|---|
| 1,566,626 A | * | 12/1925 | Steele | 221/180 |
| 1,654,877 A | * | 1/1928 | Hill | 194/257 |
| 1,729,886 A | * | 10/1929 | Massie | 221/115 |

(Continued)

FOREIGN PATENT DOCUMENTS

EP      0 339 946      11/1989

(Continued)

OTHER PUBLICATIONS

International Search Report for PCT/EP2006/060194 mailed on May 15, 2006.

(Continued)

*Primary Examiner* — Gene O. Crawford
*Assistant Examiner* — Rakesh Kumar
(74) *Attorney, Agent, or Firm* — Henderson, Lind & Ponack, L.L.P.

(57) ABSTRACT

The present invention refers to an apparatus for dispensing capsules, preferably single-use, disposable capsules for the production of beverages, brews and the like, intended for use in connection with automatic food-product vending machines. The inventive capsule dispensing apparatus includes a plurality of receptacles adapted to accommodate capsules in a stacked arrangement, at least a rotary pick-up device provided with two or more compartments distributed about the axis of rotation thereof for removing the capsules from the receptacles, and a conveyor. The capsule dispensing apparatus is characterized in that between the at least a pick-up device and the conveyor there is arranged a distribution tray including a plurality of guide partitions adapted to enable the capsules to undergo a rotary motion.

8 Claims, 2 Drawing Sheets

U.S. PATENT DOCUMENTS

| | | | | |
|---|---|---|---|---|
| 2,156,196 A | * | 4/1939 | Romanoski | 221/152 |
| 3,421,657 A | * | 1/1969 | Larson | 221/13 |
| 3,424,345 A | * | 1/1969 | Payne | 221/116 |
| 3,610,469 A | * | 10/1971 | Kuckens et al. | 221/258 |
| 3,837,528 A | | 9/1974 | Rakucewicz | |
| 4,057,171 A | | 11/1977 | Hatori et al. | |
| 4,205,763 A | * | 6/1980 | Merl | 221/173 |
| 4,245,755 A | * | 1/1981 | Craven et al. | 221/109 |
| 4,480,764 A | | 11/1984 | Takagi et al. | |
| 4,978,032 A | | 12/1990 | Newman et al. | |
| 5,012,952 A | | 5/1991 | Franz | |
| 5,052,679 A | * | 10/1991 | Sekino | 271/293 |
| 5,127,544 A | * | 7/1992 | Robinson et al. | 221/93 |
| 5,199,598 A | * | 4/1993 | Sampson | 221/194 |
| 5,351,857 A | * | 10/1994 | Gonzalez | 221/265 |
| 5,402,911 A | * | 4/1995 | Noell | 221/81 |
| 5,555,793 A | * | 9/1996 | Tocchet et al. | 99/326 |
| 5,611,456 A | * | 3/1997 | Kasper | 221/154 |
| 5,647,507 A | * | 7/1997 | Kasper | 221/151 |
| 7,628,291 B2 | * | 12/2009 | Tasso et al. | 221/123 |
| 2005/0006199 A1 | * | 1/2005 | Brugger et al. | 194/347 |
| 2005/0067425 A1 | * | 3/2005 | Bartholomew et al. | 221/119 |
| 2005/0082308 A1 | * | 4/2005 | Simson | 221/105 |
| 2006/0054455 A1 | * | 3/2006 | Kuykendall et al. | 194/217 |
| 2008/0245820 A1 | * | 10/2008 | Pfister et al. | 222/129.1 |

FOREIGN PATENT DOCUMENTS

GB    1 604 306    12/1981

OTHER PUBLICATIONS

Written Opinion of the International Searching Authority for PCT/EP2006/060194 mailed on May 15, 2006.

* cited by examiner

FIG..1

CAPSULE DISPENSING APPARATUS

BACKGROUND OF THE INVENTION

I. Field of the Invention

The present invention refers to an apparatus for dispensing capsules, preferably single-use, disposable capsules for the production of beverages, brews and the like, intended for use in connection with automatic food-product vending machines.

II. Description of the Related Art

As used in this specification, the term "capsules" shall be understood as referring to and defining cylindrically or substantially frusto-conically shaped envelopes provided with an annular rim.

Nowadays, automatic food-product vending machines, in which a capsule containing a food substance is used by the machine to either simply and readily dispense it upon request by a buyer or produce a beverage, are increasingly found in the marketplace.

As far as to the first above-mentioned mode of use of the capsules by a vending machine is concerned, there are capsule dispensers known in the art, in which a rotary pick-up device comprising a plurality of compartments withdraws a capsule from a capsule stack stored in a container. The capsule that is picked up in this way is simply dropped, i.e. allowed to fall onto a conveyer that will then carry it towards a point in the machine where the buyer is able to collect it.

On the contrary, in the case that the capsule is used to produce a beverage, capsule dispensers of the above-cited kind cannot however be used, since the brewing unit or, anyway, the unit in which the beverage is prepared must receive the capsule in a precisely defined orientation thereof in order to not only prevent the vending machine from undesirably incurring jamming or similar risks, but also ensure correct brewing of the product contained in the capsule.

For these applications, therefore, the need arises for efficient dispensing means to be provided, which are able to pick up a capsule from a storage container and deliver it towards a point of use in a well-defined orientation thereof.

The complexity of such a dispenser from a construction point of view and the kind of motions that the same dispenser has to impart to the capsule depend essentially on the manner in which the capsules themselves are stored in the automatic vending machine. In the case that such capsules are stored in bulk, i.e. loosely in a container, the dispenser must be provided with complicated orienting means that, as they pick up a capsule, are effective in disposing the same according to the proper orientation accepted by the brewing unit. On the contrary, in the case that the capsules are stored in a pre-established order, such as stacked upon each other, in the storage container, it is not sufficient for as capsule to be picked up by means of a pick-up device, and to be then dropped freely onto the brewing unit, such as this has occurred in dispensers of the kind described hereinbefore.

SUMMARY OF THE INVENTION

It therefore is the object of the present invention to provide a capsule dispensing apparatus, which overcomes the aforeindicated drawbacks and disadvantages of prior-art dispensers of the same kind.

Within this general object, it is a purpose of the present invention to provide a capsule dispensing apparatus of the above-cited kind, which is reliable in enabling the capsules to be delivered towards a point of utilization thereof, while preventing jamming or similar failure conditions from occurring and ensuring full repeatability of the dispensing procedure.

Another purpose of the present invention is to provide a capsule dispensing apparatus, which is readily capable of being used in connection with existing automatic vending machines.

Another purpose yet of the present invention is to provide a capsule dispensing apparatus, which does not take up much space and is simple in its construction so as to facilitate manufacturing and installation.

According to the present invention, these aims as set forth above are reached in a capsule dispensing apparatus for automatic food-product vending machines, which incorporates the features and characteristics as recited in the appended claims. Features and advantages of the present invention will anyway be more readily understood from the description that is given below by way of non-limiting example with reference to the accompanying drawings, in which:

DETAILED DESCRIPTION OF THE INVENTION

Figure 1:
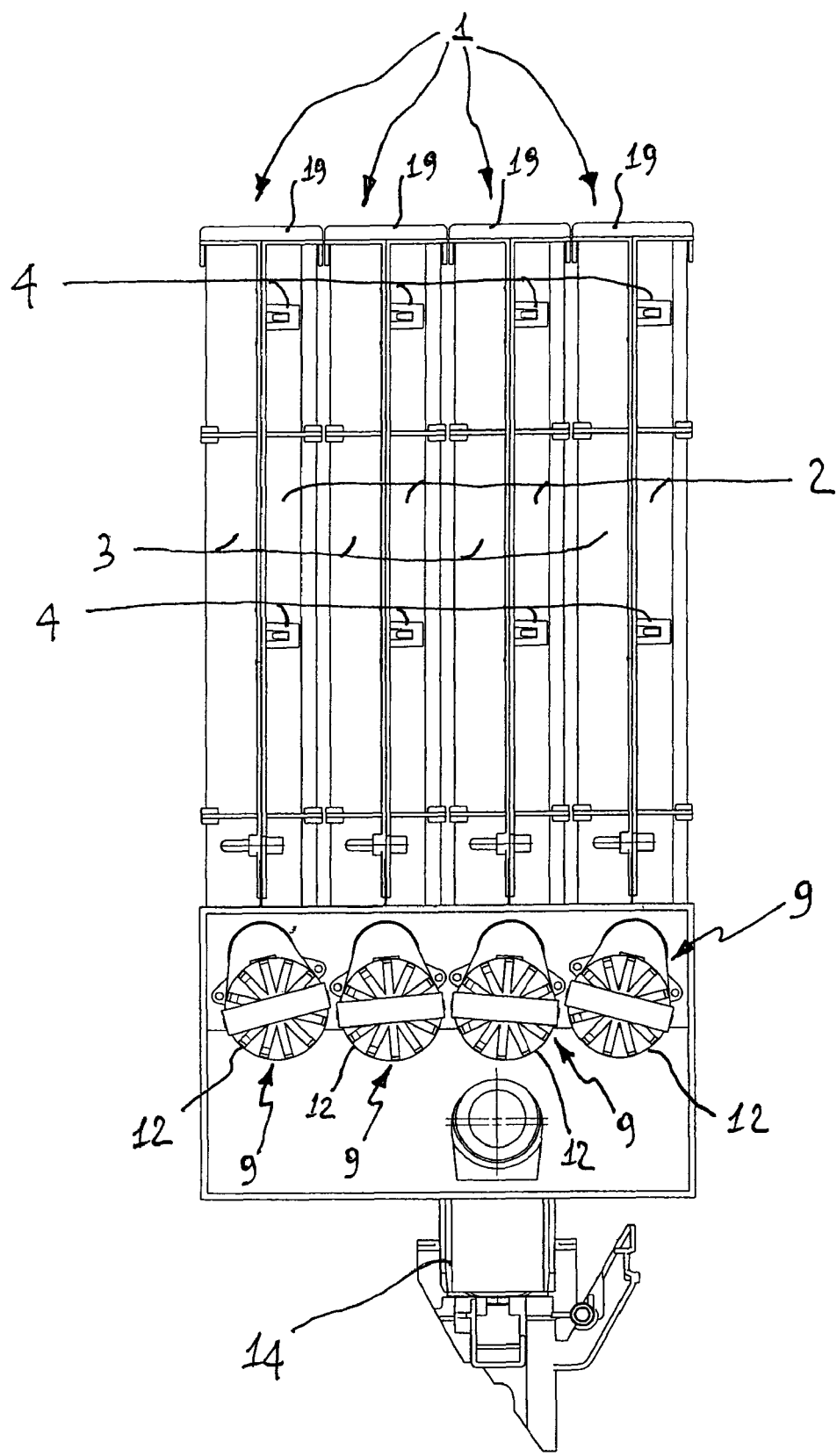
FIG. 1 is a side elevational view of the capsule dispensing apparatus according to the present invention.
Figure 2:
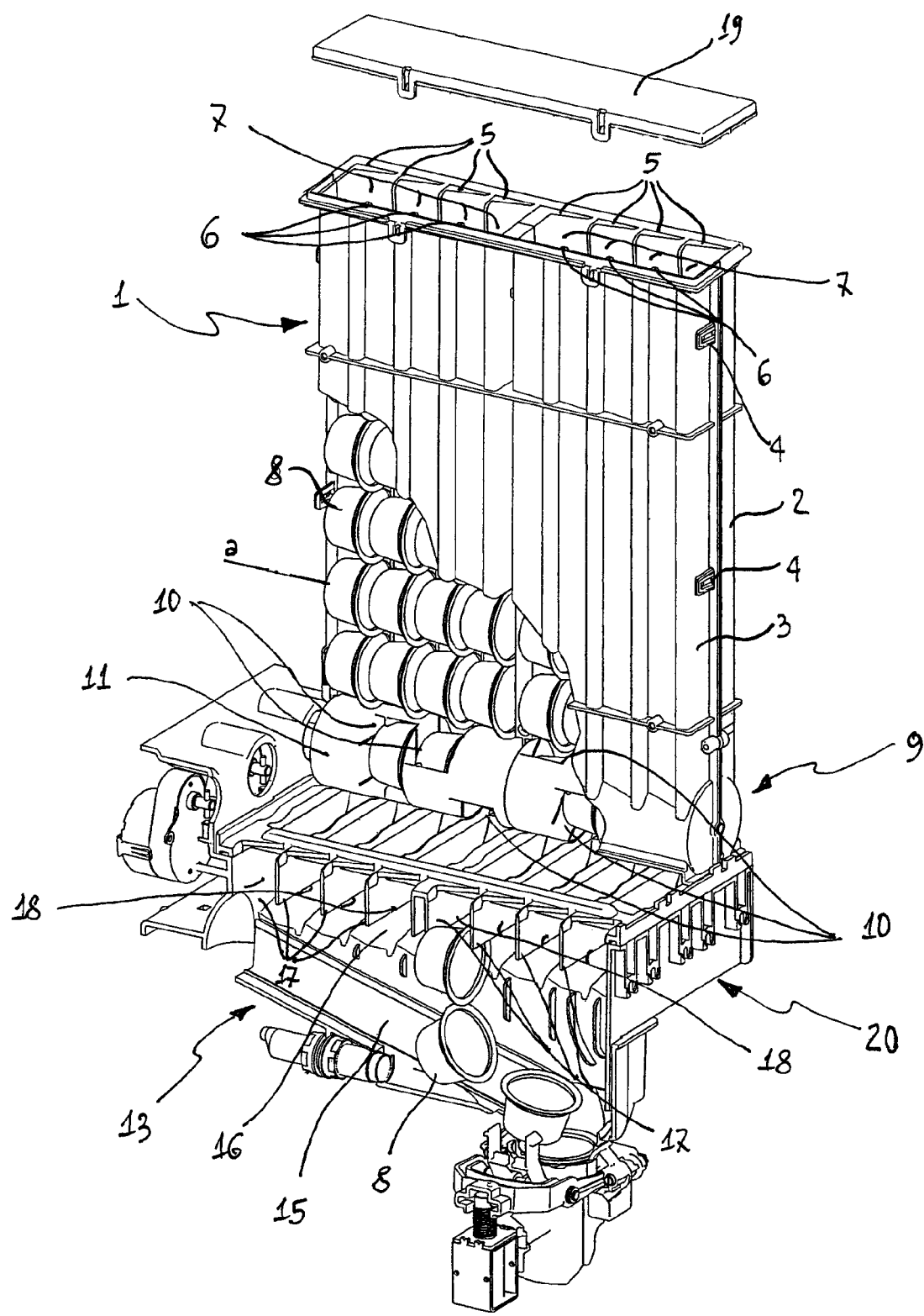
FIG. 2 is a perspective view of the capsule dispensing apparatus shown in FIG. 1, as viewed in a partially disassembled state thereof.

With reference to the above-noted Figures, the inventive capsule dispensing apparatus comprises a plurality of box-like members 1, each one of which is provided in the form of two substantially similar halves that are removably assembled with each other by means of bayonet joints 4. Each half 2, 3 comprises walls 5 and 6 that are disposed so as to face each other when the two halves 2, 3 are assembled. These walls 5, 6 define a plurality of receptacles 7, which are open at the ends thereof, and in which there can be accommodated capsules 8 in an arrangement in which they are stacked upon each other. A removable cover 19 closes one of the ends of each receptacle 7. A pick-up device 9 is provided at the base of each such box-like member 1, so that the stacked capsules 8 can be withdrawn on a one-by-one basis from the receptacles 7. Each pick-up device 9 is of the rotary type and is provided with two or more compartments 10 distributed about the axis of rotation thereof. In particular, the pick-up device 9 may include a rotating member 11 in the shape of substantially a cylinder, in which the compartments 10 are distributed according to a spiral-like pattern along the side surface of the cylinder. Such preferential distribution enables the compartments 10 to become aligned with the base of the respective receptacle 7 sequentially. In this way, the rotation of the rotary member 11 causes a single capsule 8 at a time to be withdrawn, while effectively and safely retaining the capsules 8 contained in the other receptacles 7 lying adjacent to the one involved in the actual capsule withdrawal operation. Each pick-up device 9 is driven rotatably by motor means 12 of a type known as such in the art.

The capsules 8 that are so withdrawn from the receptacles 7 are then directed towards a conveyor 13 comprising a ramp 15 that is preferably associated to an automatic capsule release device 14. The capsules 8 being conveyed along by the ramp 15, and disposed according to a pre-determined orientation thereupon, are received by the capsule released device 14 to be then laid down, under actuation of a release mechanism, into either a delivery chamber, for a buyer to collect them, or a brewing unit for a beverage to be prepared.

Between the conveyer 13 and each pick-up device 9 there is arranged a distribution tray 20 comprising a first curved or inclined wall 16 and a plurality of second walls 17 regularly spaced from each other and arranged substantially perpendicular to the first wall 16. Jointly with the second walls 17, this first wall 16 defines kind of guiding partitions 18 that enable the capsules 8 withdrawn from the receptacles 7 to perform a rotary motion.

These guide partitions 18 are arranged in correspondence to the compartments 10 of the pick-up device 9 so that the latter is able to substantially withdraw a capsule 8 from the base of the stack contained in the respective receptacle 7, and release it into one of said partitions 18. In view of rationalizing the space used to store the capsules 8 in the receptacles 7, as well as preventing the same capsules from jamming or getting stuck while moving and being handled within the dispensing apparatus, the receptacles 7 are so sized as to be able to receive and accommodate capsules in a stacked arrangement and disposed so that the longitudinal axis $\alpha$ thereof is parallel to the axis of rotation of the pick-up device 9. Thanks to such arrangement, and owing to the provision of said first curved or inclined wall 16, the guide partitions 18 cause the capsules 8 falling therein to perform a rotary motion about the longitudinal axis thereof. When the capsules 8 then leave the guide partitions 18, they fall by gravity onto the conveyor 13. As they fall in this way onto such conveyor, the position of the centre of gravity of the same capsules 8 causes them to undergo a rotation that is effective in bringing them into the pre-determined orientation required for the release device 14 to be able to receive them.

For example, the capsule dispensing apparatus according to the present invention is adapted for use in automatic vending machine for the production of brewed beverages or, equivalently, in vending machines in which the capsules are due to be dispensed in a sealed state, i.e. integral for subsequent use by the buyer according to his/her own requirements or preferences.

Fully apparent from the above description is therefore the ability of present invention to effectively reach the afore cited aims and advantages by providing a capsule dispensing apparatus, which is very simple in its construction and requires just a small space. Similarly, it can be readily appreciated how the capsule dispensing apparatus according to the present invention is fully and most advantageously reliable, thereby reducing the possibility of the capsules running into a jammed condition when being handled in the machine for dispensing.

The capsule dispensing apparatus according to the present invention advantageously ensures convenient manufacturing and can be readily adapted for use in existing vending machines.

It should be noticed that the materials used, as well as the shapes and the sizing of the individual items of the apparatus of the invention, may each time be selected so as to more appropriately meet the particular requirements or suit the particular application.

The various items and parts entering the construction of the apparatus of the present invention shall of course not be embodied strictly and solely in the manner that has been described and illustrated above, but can rather be implemented in a number of different embodiments, all of which falling within the scope of the present invention.

The invention claimed is:

1. An apparatus for dispensing capsules for use in connection with automatic food-product vending machines, each capsule having a first axis which is a longitudinal axis, said apparatus comprising:
   a plurality of receptacles configured to accommodate the dispensing capsules in a stacked arrangement with the first axis of each capsule being arranged in a substantially horizontal and co-planar position, each receptacle of said plurality of receptacles being configured so as to enable advancement of each capsule accommodated therein along said receptacle in a direction extending transversely to the first axis of each capsule;
   at least one rotary pick-up device configured to remove the capsules from said receptacles, said rotary pick-up device including at least two compartments disposed about an axis of rotation of said rotary pick-up device;
   a conveyor; and
   a distribution tray arranged between said at least one rotary pick-up device and said conveyor;
   wherein said distribution tray comprises a plurality of guide partitions configured to guide the capsules along a path and so that each capsule undergoes a first rotary motion about the first axis when moving, in use, along a respective guide partition, and said conveyor is arranged, in relation to said guide partitions, so that each capsule undergoes a second rotary motion about a second axis when moving, in use, from the respective guide partition to said conveyor, and
   wherein said distribution tray comprises a first curved or inclined wall and a plurality of second walls regularly spaced from each other and arranged substantially perpendicular to said first wall, said first wall and said second walls jointly defining said guide partitions, and the path extending parallel to said first and second walls.

2. The apparatus according to claim 1, further comprising an automatic capsule release device, wherein said conveyor comprises a ramp that is associated with said automatic capsule release device.

3. The apparatus according to claim 1, wherein said receptacles are sized and configured so as to be capable of receiving and accommodating the capsules in a stacked arrangement and disposed so that the longitudinal axis thereof is parallel to the axis of rotation of said pick-up device.

4. The apparatus according to claim 1, wherein said pick-up device comprises a rotating member having a substantially cylindrical shape, in which said compartments are distributed according to a helical pattern along a side surface of said rotating member.

5. The apparatus according to claim 1, wherein said guide partitions are disposed so as to face said compartments of said pick-up device.

6. The apparatus according to claim 5, wherein said receptacles are sized and configured so as to be capable of receiving and accommodating the capsules in a stacked arrangement and disposed so that the longitudinal axis thereof is parallel to the axis of rotation of said pick-up device.

7. The apparatus according to claim 5, further comprising an automatic capsule release device, wherein said conveyor comprises a ramp that is associated with said automatic capsule release device.

8. The apparatus according to claim 5, wherein said pick-up device comprises a rotating member having a substantially cylindrical shape, in which said compartments are distributed according to a helical pattern along a side surface of said rotating member.

* * * * *